(12) United States Patent
Brady et al.

(10) Patent No.: US 6,204,765 B1
(45) Date of Patent: Mar. 20, 2001

(54) METHOD OF DETECTING RELATIVE DIRECTION OF MOTION OF A RADIO FREQUENCY (RF) TAG

(75) Inventors: Michael J. Brady, Brewster; Rene D. Martinez, Putnam Valley; Paul A. Moskowitz, Yorktown Heights, all of NY (US)

(73) Assignee: Inkrmec IP Corp., Wilmington, DE (US)

( * ) Notice: Subject to any disclaimer, the term of this patent is extended or adjusted under 35 U.S.C. 154(b) by 0 days.

(21) Appl. No.: 09/268,422

(22) Filed: Mar. 13, 1999

Related U.S. Application Data

(63) Continuation-in-part of application No. 09/220,272, filed on Dec. 23, 1998.
(60) Provisional application No. 60/068,603, filed on Dec. 23, 1997.

(51) Int. Cl.[7] .................................................. G08B 13/14
(52) U.S. Cl. ...................... 340/572.1; 340/572.2; 340/572.4; 340/825.49; 340/825.54; 342/42; 342/114
(58) Field of Search .............................. 340/572.1, 572.2, 340/572.4, 825.49, 825.54, 825.71, 10.1, 10.51, 10.52; 342/42, 104, 107, 109, 147, 158, 357.01, 357.08, 450, 453, 114

(56) References Cited

U.S. PATENT DOCUMENTS

| | | | | |
|---|---|---|---|---|
| 4,595,915 | * | 6/1986 | Close | 340/572.1 |
| 5,055,659 | * | 10/1991 | Hendrick et al. | 235/439 |
| 5,119,104 | * | 6/1992 | Heller | 342/450 |
| 5,164,985 | * | 11/1992 | Nysen et al. | 380/9 |
| 5,430,441 | * | 7/1995 | Bickley et al. | 340/825.54 |
| 5,450,088 | * | 9/1995 | Meier et al. | 342/51 |
| 5,510,795 | * | 4/1996 | Koelle | 342/114 |
| 5,519,381 | * | 5/1996 | Marsh et al. | 340/572.1 |
| 5,548,291 | * | 8/1996 | Meier et al. | 342/51 |
| 5,726,630 | * | 3/1998 | Marsh et al. | 340/572.1 |
| 5,920,287 | * | 7/1999 | Belcher et al. | 342/450 |
| 5,929,778 | * | 7/1999 | Asama et al. | 340/825.54 |
| 5,942,987 | * | 8/1999 | Heinrich et al. | 340/825.54 |
| 5,995,046 | * | 11/1999 | Belcher et al. | 342/450 |

* cited by examiner

*Primary Examiner*—Daniel J. Wu
*Assistant Examiner*—Toan Pham
(74) *Attorney, Agent, or Firm*—Rodney T. Hodgson

(57) ABSTRACT

A method of determining relative motion between a base station and an RF Tag is disclosed, wherein a property of the RF field at the position of the tag is determined at a first time and at a second time and is used to calculate the relative motion.

10 Claims, 3 Drawing Sheets

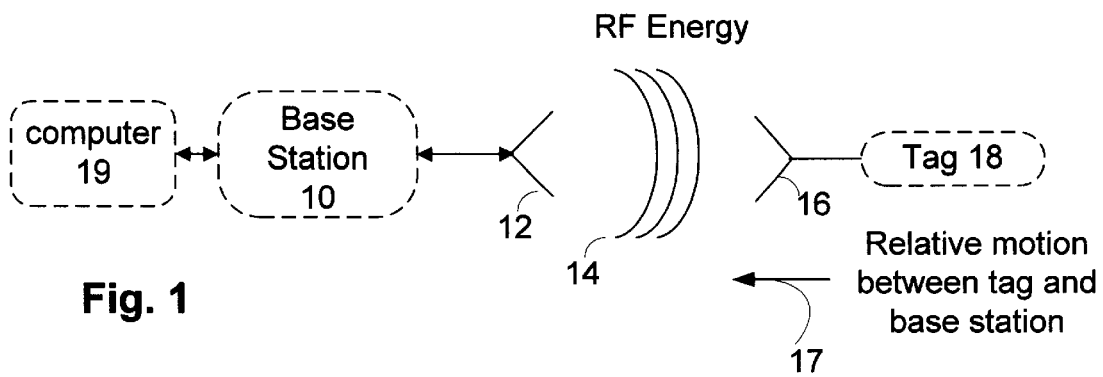
Fig. 1
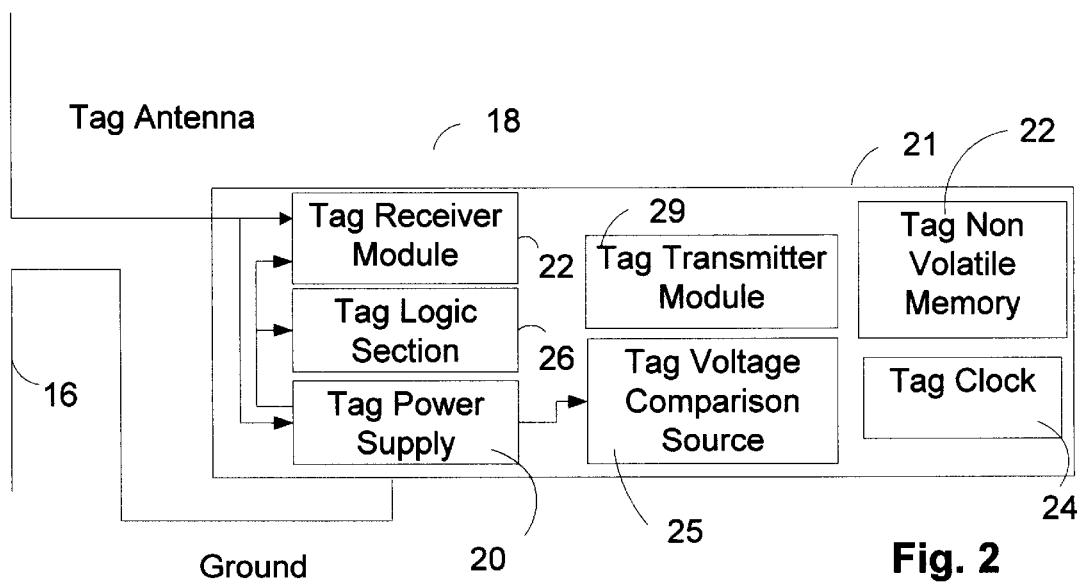
Fig. 2
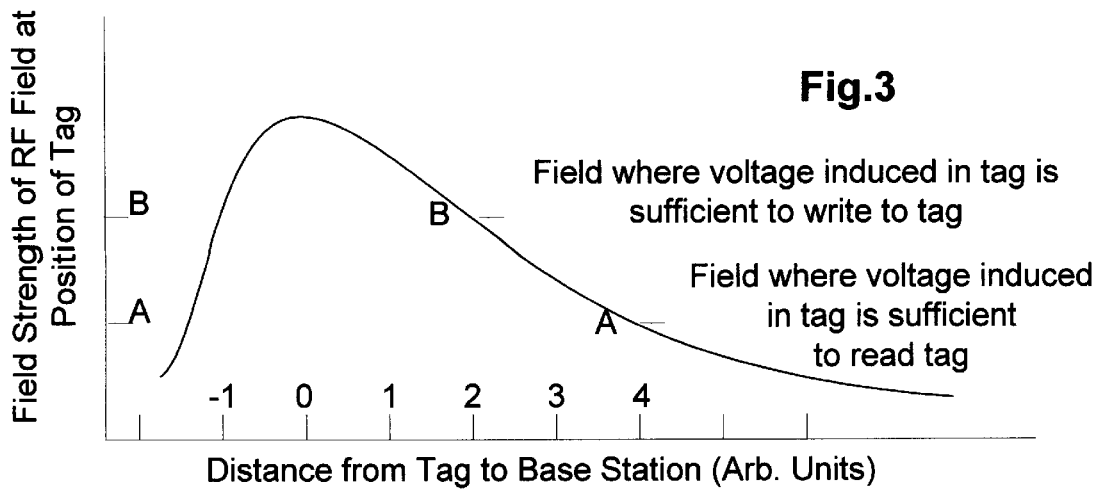

METHOD OF DETECTING RELATIVE DIRECTION OF MOTION OF A RADIO FREQUENCY (RF) TAG

CROSS-REFERENCE TO RELATED APPLICATIONS

The present application is a Continuation-in-Part of application Ser. No. 09/220,272 filed Dec. 23, 1998, entitled Apparatus and Method for RF-Tag measurement of direction of motion of a person or an object, by Brady et al., which claims the benefit of Provisional Application No. 60/068,603, filed Dec. 23, 1997.

FIELD OF THE INVENTION

The field of the invention is the field of Radio Frequency (RF) transponders (RF Tags) which receive RF electromagnetic radiation from a base station and send information to the base station by modulating the load of an RF antenna.

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna could be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" or "reflection" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor. A transistor switch also changed the loading of the transponder in U.S. Pat. No. 4,786,907 by A. Koelle.

Prior art tags have used electronic logic and memory circuits and receiver circuits and modulator circuits for receiving information from the base station and for sending information from the tag to the base station.

Prior art tags have been used to measure the relative direction and motion between a tag and a base station. For example, U.S. Pat. No 4,728,955 uses multiple base station antennas to measure tag motion, and U.S. Pat. 5,510,795 uses a base station with a single antenna and a phase sensitive detection system to measure relative location and speed of the tag with respect to the base station. However, these systems are best used when the relative velocity is constant and the direction is known, as for a train moving on tracks or a package on a conveyer belt.

The continuing march of semiconductor technology to smaller, faster, and less power hungry has allowed enormous increases of function and enormous drop of cost of such tags. Presently available research and development technology will also allow new function and different products in communications technology.

RELATED PATENTS AND APPLICATIONS

Related U.S. Patents assigned to the assignee of the present invention include:5,521,601; 5,528,222; 5,538,803; 5,550.547; 5,552,778; 5,554,974; 5,563,583; 5,565,847; 5,606,323; 5,635,693; 5,673,037; 5,680,106; 5,682,143; 5,729,201; 5,729,697; 5,736,929; 5,739,754; 5,767,789; 5,777,561; 5,786,626; 5,812,065; and 5,821,859. U.S. Patent applications assigned to the assignee of the present invention include: application Ser. No. 08/626,820, filed: Apr. 3, 1996 "Method of Transporting RF Power to Energize Radio Frequency Transponders", by Heinrich, Zai, et al.; application Ser. No. 08/694,606 filed Aug. 9,1996 entitled RFID System with Write Broadcast Capability by Cesar et al.; application Ser. No. 08/681,741 filed Jul. 29, 1996 entitled RFID Transponder with Electronic Circuitry Enabling and Disabling Capability, by Heinrich, Goldman et al.; and application Ser. No. 09/153,617 filed Sep. 15,1998, entitled RFID Interrogator Signal Processing System for Reading Moving Transponder, by Zai et al. The above identified U.S. Patents and U.S. Patent applications are hereby incorporated by reference.

OBJECTS OF THE INVENTION

It is an object of the invention to produce an RF transponder comprising circuits which can be made at low cost. It is a further object of the invention to produce an RF transponder which can be used at high frequencies. It is a further object of the invention to produce an RF transponder with maximum range. It is a further object of the invention to produce an RF transponder with circuits which require very little current. It is a further object of the invention to produce an electronic chip for an RF transponder which can be produced simply with standard semiconductor manufacturing techniques. It is a further object of the invention to provide an RF transponder which may determine the relative direction of motion between the transponder and a base station. It is an object of the invention to produce a method of determining the relative velocity of motion between a base station and an RF transponder.

SUMMARY OF THE INVENTION

The present invention is a system, apparatus and method to use known characteristics of the RF field produced by a base station to determine the relative motion between the base station and an RF tag. A property of the RF field produced by the base station is determined at the position of the tag, and the rate of change of the property is used to determine whether the tag is approaching the base station or receding from the base station. If the RF field is asymmetric with respect to the base station, the direction of travel may be determined.

BRIEF DESCRIPTION OF THE DRAWINGS

FIG. 1 shows a sketch of the invention.

FIG. 2 shows a block diagram of an RF tag.

FIG. 3 shows a sketch of the field strength of the RF field produced by a base station as a function of distance along a particular line.

DETAILED DESCRIPTION OF THE INVENTION

Figure 4:
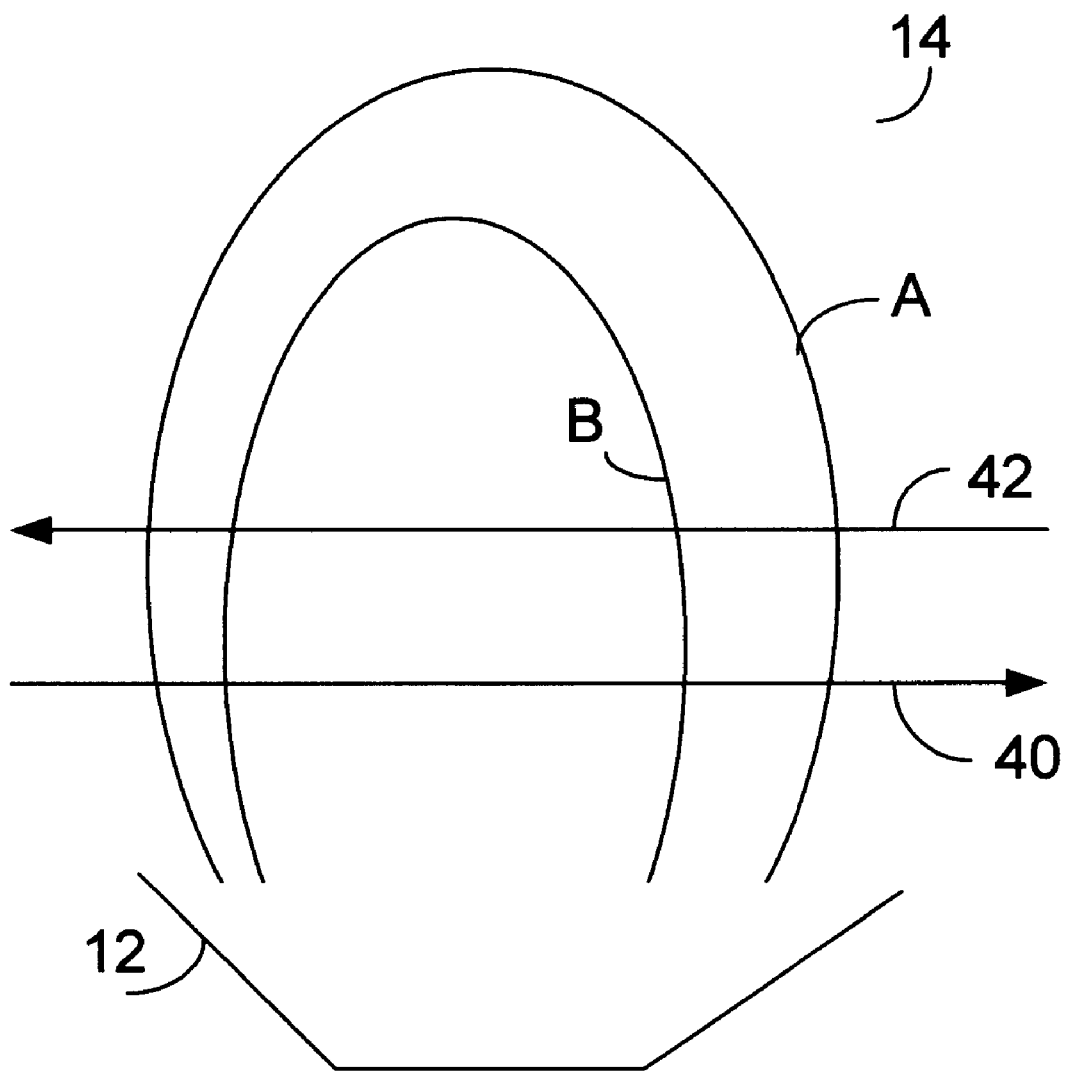
FIG. 4 shows a two dimensional plan sketch of a base station antenna broadcasting RF energy in an asymmetric pattern.

FIG. 1 shows a schematic diagram of a base station 10 connected to an antenna 12 which sends RF energy 14 to an RF tag 16 having an antenna 18. A computer 19 is shown connected to base station 10, but the base station 10 may have many or all of the characteristics of a computer or microprocessor. FIG. 1 shows that there is relative motion 17 between the tag 18 and the base station 10. In general, the tag will be moving and the base station fixed, but the tag may be fixed and the base station moving, or both base station and tag may be moving.

FIG. 2 shows a block diagram of tag 18. The tag antenna 16 is connected to the tag power supply 20, which may supply power to the tag electronics section 21. The tag receiver section 22 and the tag transmitter section 23 are also connected to the tag antenna. (The connection of the tag transmitter section is not shown). The tag has a non volatile memory section 24, a tag voltage comparison source 25, a tag logic section 26 and may have a tag clock 24. The tag voltage comparison source 25 is used to decide if the voltage produced by the tag power supply 20 is sufficient that the tag logic section 26 may write to the tag non volatile memory 24.

FIG. 3 shows a sketch of the field strength of the RF field produced by the base station 10 as a function of distance along a particular line (such as the line from the base station antenna 12 to the tag antenna 16 noted schematically in FIG. 1) measured from the base station antenna 12. The base station antenna 12 may be so constructed that the RF field distribution is asymmetric with respect to the base station antenna as is shown schematically in FIG. 3. When the tag is approaching the base station from the positive direction sketched in FIG. 3, the RF field will be insufficient to power up the tag electronics until the tag reaches the distance marked as 4units on FIG. 3. As the tag moves relatively nearer to the base station, the power available to power the tag electronics grows until at a position marked 2 units in FIG. 3, the tag has enough power to write to the tag electronics. During the time that the tag moves from position 4 to position 2, the base station may communicate with the tag, and read the tag ID and inquire whether the tag has enough voltage from the tag power supply 20 to write to the tag non volatile memory 24. The tag decides whether the voltage is sufficient to write the non volatile memory by comparing the voltage produced by the tag power supply 20 with the tag voltage comparison source 25, which is a band gap generator in the most preferred embodiment. However, the tag voltage comparison source may be any voltage which does not change appreciably as the tag moves past the base station. In fact, the tag voltage comparison source may be a battery in an active tag, and the tag power supply 20 may be just a device to measure the strength of the RF field produced by the base station 10 at the position of the tag 18. In the most preferred present embodiment, the tag notes the time $t_1$ that the tag first may be read, and the time $t_2$ where the tag first may be written. As the tag moves past the base station, the tag once again may not be written at time $t_3$ and at a later time $t_4$ may not be read. The base station notes the times, and calculates that $t_2-t_1 > t_3-t_4$. The tag may then decide that the tag is moving right to left. If the opposite inequality holds, the tag is moving left to right.

In another preferred embodiment it is anticipated by the inventors that the tag may make many more measurements of the RF field strength than the two points described above, and that many different configurations of the RF field may be used so that the tag and/or the base station knows the position and/or direction of relative motion and/or speed of the tag and the base station. For example, the field may sinusoidally or otherwise vary with distance with a changing spatial period, and the measurement of the varying field may be used to determine if the spatial period is increasing or decreasing, and hence determine relative motion.

FIG. 4 shows a two dimensional plan sketch of a base station antenna 12 broadcasting RF energy 14 in an asymmetric pattern. Lines of equal field strength A and B are shown. Such a field strength distribution may be obtained by placing the antenna 12 in the wall of a corridor, and the motion 40 and 42 of a tag along the corridor may be distinguished by the relative time taken to move between the two limits of field strength A and field strength B as noted above in the discussion of FIG. 3.

Further embodiments of the invention include mounting base station antennas in doorways to monitor the entrance and exit of tags and the people, animals, or objects associated with the tags.

Figure 5:
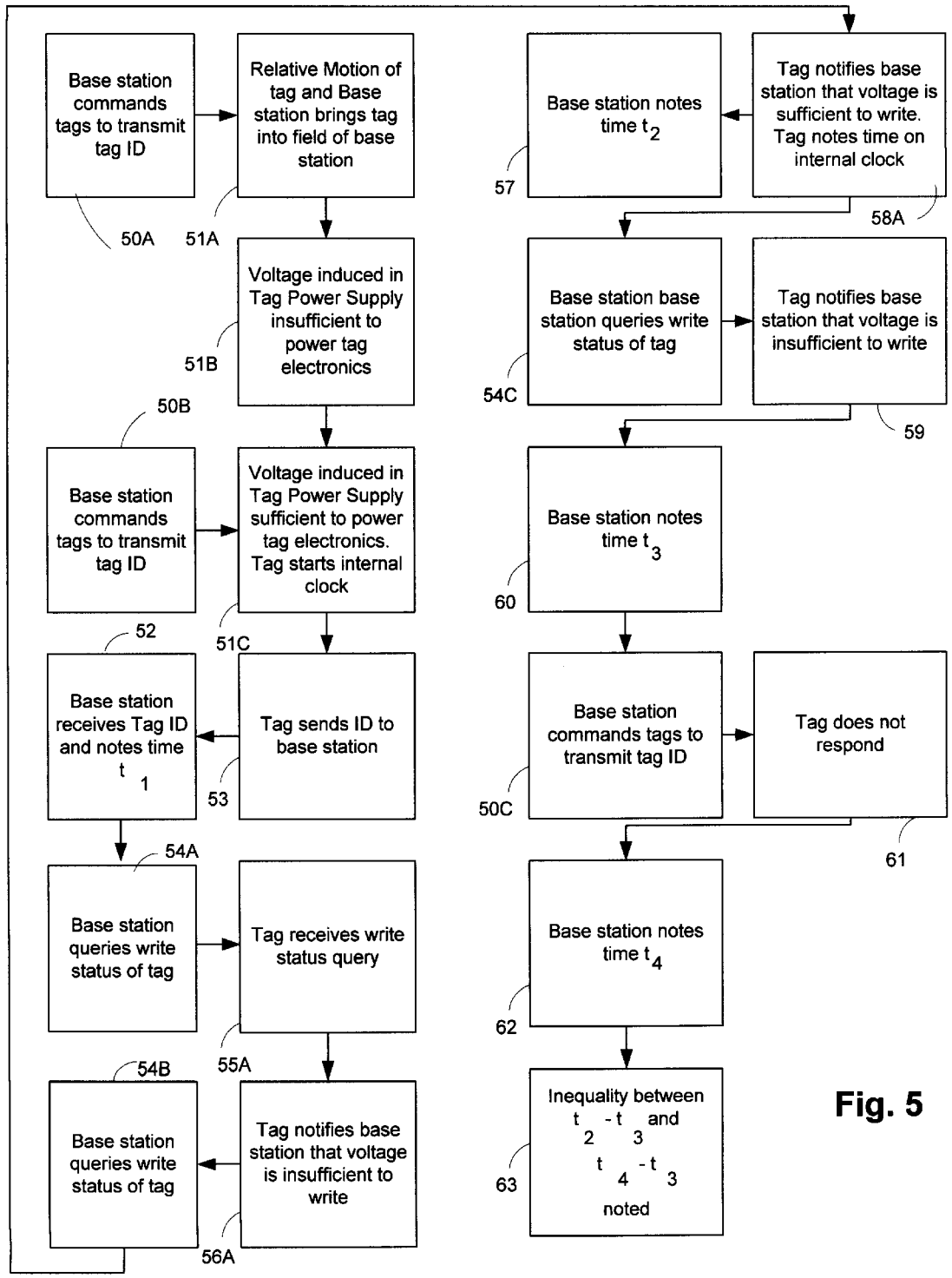
FIG. 5 shows a flow chart of the method of the most preferred embodiment of the invention.

FIG. 5 shows a flow chart of the method of the most preferred embodiment of the invention. A base station transmits commands in step 50A to any tag in range to report the tag identification or other command so that the base station can tell that a tag is in range. A tag moves into the RF field of the base station in step 51A, but the RF field is insufficient in step 51B to power the tag electronics so that the tag can respond to the identification command. Finally, in step 51C, the tag has reached a position where the tag electronics have enough power to respond, and the tag may start an internal clock in step 51C and note the time. In step 53, the tag responds to the base station at the appropriate time after the read command 50B. The base station then receives the tag ID in step 52, and notes the time $t_1$ of first reception in the case that the tag is not keeping the time. The base station then queries the tag in step 54A whether the tag has enough voltage to write to the tag non volatile memory. The tag receives the step 54A query in step 55A, and has not sufficient voltage to write to the non volatile memory. The tag may notify the base station in step 56A that the voltage is insufficient to write, or it may remain silent which will be read by the base station as the same result. The base station continues to query the tag in step 54B, until the tag notifies the base station in step 58A that the voltage is sufficient to write to the non volatile memory. The tag may note the time on its internal clock, and calculate the time taken to move from a threshold of reading to a threshold of ability to write, or the base station in step 57 may note the time $t_2$ where the tag may write. The base station may continuously query the write status of the tag in step 54C until the tag moves out of write range, or alternatively the tag may signal the base station when it has moved out of write range in step 59. The tag may note the time on its internal clock, and/or the base station in step 60 may note the time $t_3$ when the tag moves out of write range. The base station commands the tag to return its ID until the tag moves out of read range in step 61. The base station notes the time $t_4$ when the tag has moved out of range in step 62. The inequality between $t_2-t_1$ and $t_3-t_4$ may then be calculated by the base station 10 or the computer 19 and the result used to determine the direction of relative motion between the tag and the base station.

The inventors anticipate that the tag may measure many more voltages and hence many more points in the determination of field strength as a function of time, and the tag itself may determine the relative motion of the tag and the base station. In particular, the inventors anticipate that the tag may write the data to its non volatile memory during the time that the tag voltage is sufficient to write the information.

Obviously, many modifications and variations of the present invention are possible in light of the above teachings. It is therefore to be understood that, within the scope of the appended claims, the invention may be practiced otherwise then as specifically described.

We claim:

1. A method of determining the relative motion between a radio frequency (RF) transponder (tag) and a base station, wherein the base station produces an RF field at the position of the tag, comprising:

a) determining a property of the RF field at the position of the tag at a first time $t_1$;

b) determining the property of the RF field at the position of the tag at a second time $t_2$; and c) determining the relative motion between the tag and the base station.

2. The method of claim 1, where the property of the RF field is the field strength of the RF field.

3. The method of claim 2, where the field strength of the RF field at the position of the tag is determined by determining the strength of the RF field backscattered from the tag to the base station.

4. The method of claim 2, where the field strength of the RF field at the position of the tag is determined by comparing a voltage induced in the tag with a comparison voltage.

5. The method of claim 4, where the comparison voltage is a comparison voltage used by the tag to determine if the tag may write to the tag non-volatile memory.

6. The method of claim 2, where the field strength of the RF field is asymmetric with respect to the base station.

7. The method of claim 6, where the field strength of the RF field at the position of the tag is determined by determining the strength of the RF field backscattered from the tag to the base station.

8. The method of claim 6, where the field strength of the RF field at the position of the tag is determined by comparing a voltage induced in the tag with a comparison voltage.

9. The method of claim 8, where the comparison voltage is a comparison voltage used by the tag to determine if the tag may write to the tag non-volatile memory.

10. The method of claim 1, where the property of the RF field is the phase of the RF field.

* * * * *

UNITED STATES PATENT AND TRADEMARK OFFICE
CERTIFICATE OF CORRECTION

PATENT NO.    : 6,204,765 B1
DATED         : March 20, 2001
INVENTOR(S)   : Michael J. Brady, Rene D. Martinez and Paul A. Moskowitz It is certified that error appears in the above-identified patent and that said Letters Patent is hereby corrected as shown below:

<u>Title page,</u>
Item [73], delete "Inkrmec IP Corp., Wilmington, DE (US)," and correct the Assignee information to read:
-- [73] Assignee: Intermec IP Corp., Wilmington, DE (US) --.

Signed and Sealed this

Thirteenth Day of August, 2002

*Attest:*

*Attesting Officer*

JAMES E. ROGAN
*Director of the United States Patent and Trademark Office*